US012735918B2

(12) United States Patent
Kemnitz et al.

(10) Patent No.: US 12,735,918 B2
(45) Date of Patent: Sep. 15, 2026

(54) VEHICLE DOOR LATCH ASSEMBLY WITH CABLE BLOCKER

(71) Applicant: Ford Global Technologies, LLC, Dearborn, MI (US)

(72) Inventors: Karin Helga Kemnitz, Northville, MI (US); Daniel Carl Bejune, Southfield, MI (US); Eugene John Ficyk, Livonia, MI (US); Aileen M. DeVoe, Royal Oak, MI (US); Sean Timothy Ryan, Farmington Hills, MI (US); Alvin Samuel Chiang, Royal Oak, MI (US); Sohail Jamal, Bloomfield Hills, MI (US); Selvakumar Inbaraj Daniel, Novi, MI (US); Paul Matthew Minutolo, Grosse Ile, MI (US); Lavanya Vemuri, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 18/893,238

(22) Filed: Sep. 23, 2024

(65) Prior Publication Data

US 2026/0085551 A1 Mar. 26, 2026

(51) Int. Cl.
*E05B 77/04* (2014.01)
*E05B 77/06* (2014.01)
*E05B 79/20* (2014.01)

(52) U.S. Cl.
CPC .............. *E05B 77/04* (2013.01); *E05B 79/20* (2013.01); *E05B 77/06* (2013.01)

(58) Field of Classification Search
CPC ........... E05B 79/20; E05B 77/04; E05B 77/06
See application file for complete search history.

(56) References Cited

U.S. PATENT DOCUMENTS 3,719,248 A * 3/1973 Breitschwerdt ......... E05B 77/06 180/282
5,092,642 A * 3/1992 Lindmayer ............. E05B 77/42 292/201

(Continued)

FOREIGN PATENT DOCUMENTS

CN 102575487 A 7/2012
CN 109415912 A 3/2019

(Continued)

*Primary Examiner* — Christine M Mills
*Assistant Examiner* — Faria F Ahmad
(74) *Attorney, Agent, or Firm* — Vichit Chea; Price Heneveld LLP

(57) ABSTRACT

A vehicle door latch assembly includes a handle assembly configured to be assembled onto a door of a vehicle. The latch assembly is configured to move between a latched position latching the door in a closed position and an unlatched position. The cable assembly is operatively coupled between the handle assembly and the latch assembly and includes a housing defining a travel space, a cable operatively coupled between the handle assembly and the latch assembly and extending into the housing, and a pivot arm coupled to the cable and configured to rotate within the travel space when the handle assembly is actuated by a pull force. A blocker mechanism is located proximate to the travel space and is configured to block movement of the pivot arm within the travel space when forcibly contacted with an object.

16 Claims, 3 Drawing Sheets

(56) References Cited

U.S. PATENT DOCUMENTS

| | | | | |
|---|---|---|---|---|
| 6,007,122 | A | 12/1999 | Linder et al. | |
| 6,042,159 | A * | 3/2000 | Spitzley | E05B 85/16 292/216 |
| 6,067,869 | A * | 5/2000 | Chilla | E05B 77/04 74/543 |
| 6,099,052 | A * | 8/2000 | Spitzley | E05B 77/06 292/336.3 |
| 6,264,257 | B1 * | 7/2001 | Meinke | E05B 79/20 292/336.3 |
| 6,382,688 | B1 * | 5/2002 | Agostini | E05B 85/14 292/336.3 |
| 6,565,134 | B1 | 5/2003 | Stuart et al. | |
| 7,070,216 | B2 * | 7/2006 | von zur Muehlen | E05B 77/06 70/92 |
| 8,322,077 | B2 * | 12/2012 | Papanikolaou | E05B 85/16 292/336.3 |
| 8,899,640 | B2 * | 12/2014 | Bertolotti Potachin | E05B 79/20 292/336.3 |
| 9,062,477 | B2 * | 6/2015 | Da Deppo | E05B 77/06 |
| 9,382,734 | B2 * | 7/2016 | Rosales | E05B 79/06 |
| 9,695,614 | B2 * | 7/2017 | Jeong | E05B 1/0038 |
| 10,072,448 | B2 * | 9/2018 | Puscas | E05B 77/04 |
| 10,240,370 | B2 * | 3/2019 | Puscas | E05B 79/22 |
| 10,689,887 | B2 * | 6/2020 | Gray | E05B 77/04 |
| 10,808,432 | B2 * | 10/2020 | Kilian | E05B 77/04 |
| 10,815,705 | B2 * | 10/2020 | Puscas | E05B 77/04 |
| 10,975,598 | B2 * | 4/2021 | Guerin | E05B 85/16 |
| 11,578,511 | B2 * | 2/2023 | Corwin | E05B 85/10 |
| 12,320,169 | B2 * | 6/2025 | Farnesi | E05B 77/26 |
| 2018/0291654 | A1 | 10/2018 | Bejune et al. | |
| 2025/0290355 | A1 * | 9/2025 | Szente | E05B 81/18 |

FOREIGN PATENT DOCUMENTS

| | | | | |
|---|---|---|---|---|
| CN | 109538036 | A | 3/2019 | |
| DE | 102005049144 | A1 | 4/2007 | |
| DE | 19511651 | A1 | 7/2008 | |
| DE | 102016102209 | A1 | 8/2017 | |
| DE | 102016212215 | A1 | 1/2018 | |
| EP | 1094182 | A2 | 4/2001 | |
| EP | 1197620 | A2 * | 4/2002 | E05B 77/34 |
| EP | 1937920 | B1 | 7/2008 | |
| JP | 2009007788 | A | 1/2009 | |

* cited by examiner

VEHICLE DOOR LATCH ASSEMBLY WITH CABLE BLOCKER

FIELD OF THE DISCLOSURE

The present disclosure generally relates to vehicle door latch and handle assemblies having a cable, and more particularly relates to a vehicle door latch cable assembly that may prevent the likelihood of a door unlatching during an impact event.

BACKGROUND OF THE DISCLOSURE

Motor vehicles are commonly equipped with door latches that are used to latch and unlatch a passenger door. The door latch is typically operatively coupled to a door handle via a cable, such as a Bowden cable. A user may pull on the handle to actuate the latch to open the door. It may be desirable to provide for a vehicle door latch assembly with a cable arrangement that may reduce the likelihood of the door from opening during certain scenarios.

SUMMARY OF THE DISCLOSURE

According to a first aspect of the present disclosure, a vehicle door latch assembly includes a handle assembly configured to be assembled onto a door of a vehicle. The latch assembly is configured to move between a latched position latching the door in a closed position and an unlatched position. The cable assembly is operatively coupled between the handle assembly and the latch assembly and includes a housing defining a travel space, a cable operatively coupled between the handle assembly and the latch assembly and extending into the housing, and a pivot arm coupled to the cable and configured to rotate within the travel space when the handle assembly is actuated by a pull force. A blocker mechanism is located proximate to the travel space and is configured to block movement of the pivot arm within the travel space when forcibly contacted with an object.

Embodiments of the first aspect of the present disclosure can include any one or a combination of the following features:

- the pivot arm rotates about a pivot axis and is connected to the cable;
- the cable comprises a wire rope extending through a sheath;
- the wire rope is connected to the pivot arm;
- the cable comprises a Bowden cable;
- the pivot arm has a cam surface that engages the wire rope;
- the blocker mechanism comprises a deformable material that compresses under force to extend within the travel space to block movement of the pivot arm;
- the deformable material comprises metal;
- the metal comprises a steel staple;
- the blocker mechanism has a U-shape with sidewalls that allow the pivot arm to extend between the sidewalls to limit movement and extend into the travel space to reduce the likelihood of movement of the pivot arm between the sidewalls during an impact; and
- the blocker mechanism comprises a force receiving pad coupled to a foot that is configured to rotate about an axis parallel to the cable axis.

According to a second aspect of the present disclosure, a vehicle door latch assembly includes a handle assembly configured to be assembled onto a door of a vehicle, a latch assembly configured to move between a latched position latching the door in a closed position and an unlatched position and a cable assembly operatively coupled between the handle and the latch. The cable assembly includes a housing defining a travel space, a wire rope operatively coupled to the handle assembly and the latch assembly and extending into the housing, a pivot arm coupled to the wire rope and configured to rotate within the travel space when the handle assembly is actuated by a pull force, wherein the pivot arm has a cam surface that engages the wire rope, and a blocker mechanism located proximate to the travel space and configured to block movement of the pivot arm within the travel space when forcibly contacted with an object.

Embodiments of the second aspect of the present disclosure can include any one or a combination of the following features:

- the pivot arm rotates about a pivot axis and is connected to the wire rope;
- a sheath surrounding a rotation of the wire rope;
- the wire rope and sheath is a Bowden cable;
- the blocker mechanism comprises a deformable material that compresses under force to extend within the space to block movement of the pivot arm;
- the deformable material comprises metal;
- the metal comprises a steel staple;
- the blocker mechanism has a U-shape with sidewalls that allow the pivot arm to extend between the sidewalls to limit movement and extend into the travel space to reduce the likelihood of movement of the pivot arm between the sidewalls during an impact; and
- the blocker mechanism comprises a force receiving pad coupled to a foot that is configured to rotate about an axis parallel to the cable axis.

These and other features and objects of the present disclosure will be further understood and appreciated by those skilled in the art by reference to the following specification, claims, and appended drawings.

DETAILED DESCRIPTION OF PREFERRED EMBODIMENTS

Figure 1:
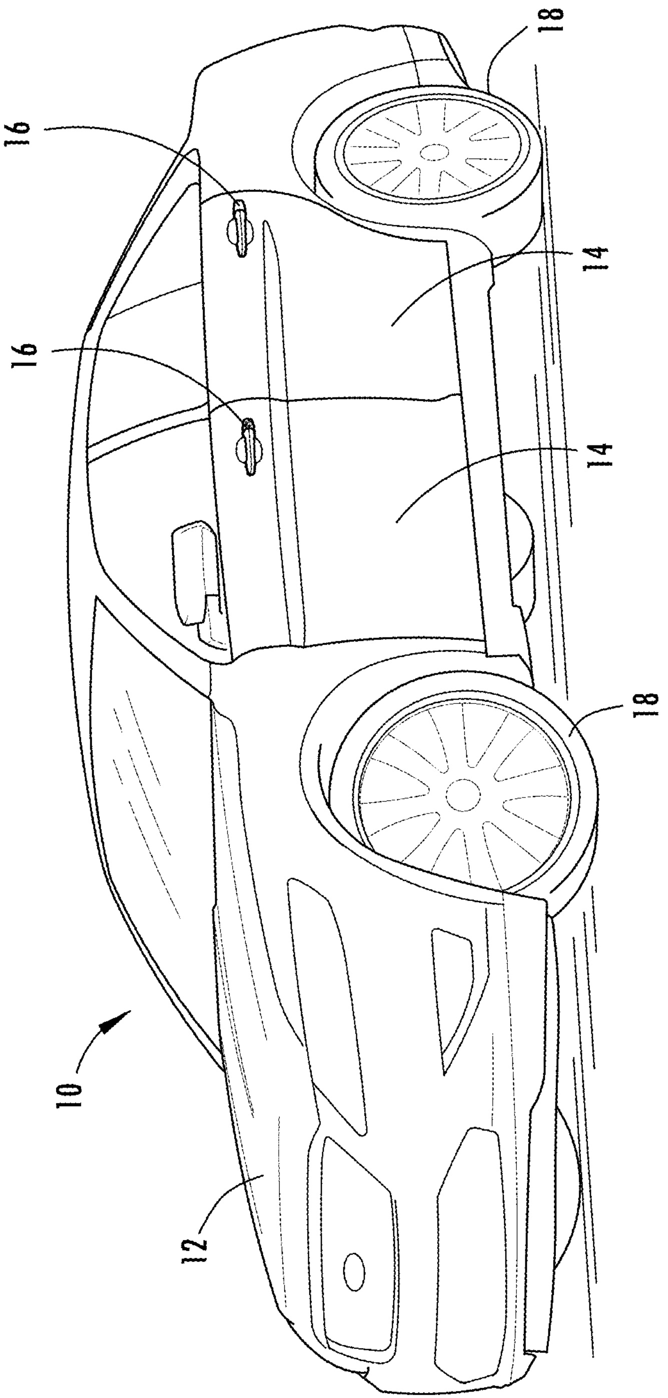
FIG. 1 is a front side perspective view of a motor vehicle having side passenger doors each equipped with a door latch assembly, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle door latch assembly having a cable assembly and blocker mechanism. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, an automotive or a motor vehicle 10 is generally illustrated in the form of a wheeled passenger vehicle configured as a sedan, according to one example. The motor vehicle 10 has a body 12 which generally defines a cabin interior. The body 12 typically has body panels, doors, windows, a windshield and a roof and defines a front end, a rear end and lateral sides of the motor vehicle 10. The motor vehicle 10 is illustrated equipped with a plurality of wheel and tire assemblies 18 that roll on the ground or roadway. The cabin interior may include a passenger compartment that typically includes a plurality of seat assemblies to accommodate a driver and passengers. It should be appreciated that the motor vehicle 10 may be equipped with various accommodations and accessories and may otherwise be configured in another vehicular form, such as a truck, a van, an SUV, a bus, a motorhome or other configurations of a motor vehicle.

The motor vehicle 10 is shown having a pair of passenger doors 14 as closure parts of the body 12 provided on the left side of the motor vehicle 10. The passenger doors 14 include a front side door and a rear side door in the example shown. It should be appreciated that the opposite side of the motor vehicle 10 likewise has a pair of passenger doors that may be likewise configured. Each of the doors 14 may be hingedly connected to a support structure of the motor vehicle 10 such as a support pillar. Each door 14 is shown having a handle assembly 16 which is operatively coupled to a door latch which is part of a door latch assembly that latches the door 14 to a support structure such as a pillar on or proximate to the body 12 in a latched position when the corresponding door 14 is in the closed door position. The handle assembly 16 may be pulled with a pull force by a user to unlatch the latch to release the corresponding door 14 and allow the door 14 to move, e.g., rotate about the hinges, to an open door position.

Figure 2C:
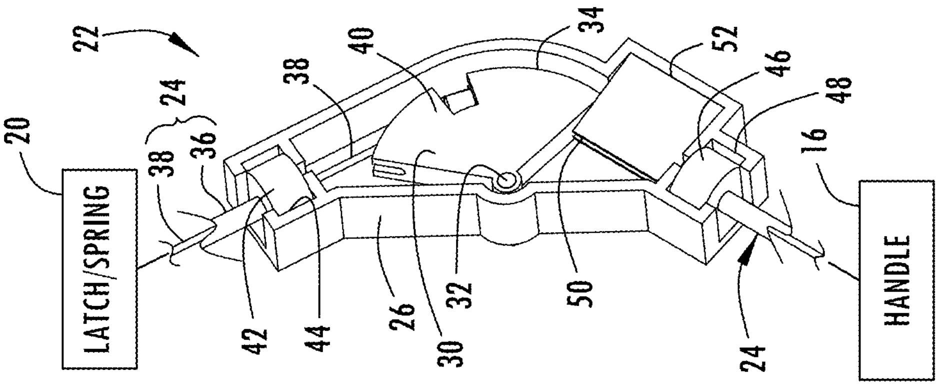
FIG. 2C is a side perspective view of the vehicle door latch assembly showing the blocker mechanism blocking movement of the pivot arm in the latched position to reduce the likelihood of a door unlatching.
Figure 2B:
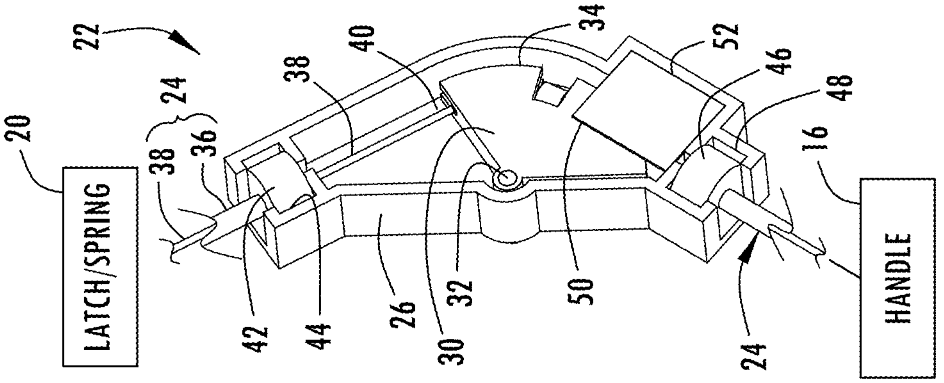
FIG. 2B is a side perspective view of the vehicle door latch assembly shown in FIG. 2A with the pivot arm in a door unlatched position.
Figure 2A:
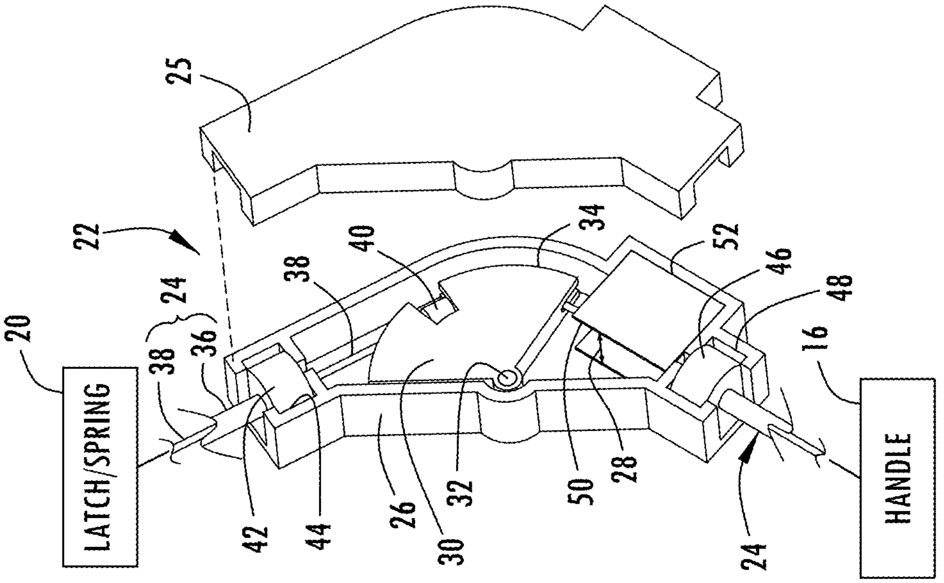
FIG. 2A is a perspective view of a vehicle door latch assembly having a blocking mechanism and a rotating pivot arm in a door latched position, according to a first embodiment.

The handle assembly 16 is part of a door latch assembly 20 which is shown in one embodiment in FIGS. 2A-2C. The door latch assembly 20 includes a door latch assembly 20 with a spring and a cable assembly 22. The handle assembly 16 is operatively coupled to the door latch assembly 20 with the spring via a cable assembly 22. The cable assembly 22 includes a cable 24 which extends within a cylindrical conduit which is referred to as a sheath 36 and is operatively coupled at opposite ends to the handle assembly 16 and the door latch assembly 20. In one example, the cable assembly 22 is referred to as a Bowden cable having the sheath 36 that surrounds a wire rope 38 and allows axial movement of the wire rope 38 within the sheath 36 relative to the sheath 36. The cable assembly 22 includes a housing 26 having a rotating pivot arm 30 that pivots about a pivot axle 32 and has an outer cam surface 34 on the periphery for engaging the wire rope 38 as the wire rope under tension bends on the cam surface 34. The pivot arm 30 is shown having a pie shape, however, the pivot arm 30 may have other shapes and sizes such as a lever or disc shape. The wire rope 38 has an enlarged retainer member crimped or otherwise connected onto the wire rope 38 and positioned within a holding slot 41 on the cam surface 34 of the pivot arm 30 such that the wire rope 38 is fixed on the cam surface 34. The sheath 36 of the cable 24 is connected at one end of the housing 26 via a first coupler 42 which fits within a first retainer pocket 44. At the opposite end of the housing 26, the sheath 36 of the cable 24 likewise is connected to the housing 26 via a second coupler 46 disposed within a second retainer pocket 48. As such, the sheath 36 of the cable 24 is connected at both ends of the housing 26 and the wire rope 38 extends into the housing 26 and is moveable axially along its elongated length while rotating with the pivot arm 30 on the cam surface 34 of the pivot arm 30 to rotate the pivot arm 30 between door latched and unlatched positions.

As seen in FIG. 2A, the cable assembly 22 is shown having the pivot arm 30 in a latched position of the door latch assembly 20 with the pivot arm 30 in the fully counterclockwise position. When a user applies a pull force to pull on the handle assembly 16, the handle assembly 16 in turn pulls the wire rope 38 under tension to cause the pivot arm 30 to rotate clockwise and into an unblocked travel space 28 as illustrated in FIG. 2B sufficient for the wire rope 38 to pull the door latch to the unlatched position and allow the door to freely move to the open door position. When the handle assembly 16 is released, a spring associated with or proximate to the door latch assembly 20 returns the wire rope 38 under tension to allow the wire rope 38 to return the wire rope 38 and pivot arm 30 to the latched position.

The cable assembly 22 includes a blocking mechanism 50 that is positioned within the housing 26 within a travel space 28 proximate to the pivot arm 30. The blocking mechanism 50 is configured to allow the pivot arm 30 to rotate to the unlatched position within the travel space 28 without any blocking interference. In the first embodiment shown in FIGS. 2A-2C, the blocking mechanism 50 is formed of a deformable material, such as metal, such as a steel staple which has opposite side walls and an interconnecting wall that generally define a U-shaped structure with an opening in the travel space 28 through which the pivot arm 30 may rotate when moving between the latched and unlatched positions. When the vehicle door 14 and latch assembly 20 are subjected to a side impact of sufficient force, the blocking mechanism 50 is configured to deform so as to extend within the travel space 28 and thereby block the movement of the rotating arm 30 from moving from the latched position to the unlatched position. This is shown in FIG. 2C where clockwise rotation of the pivot arm 30 into the travel space 28 is prevented after the blocking mechanism 50 is compressed and thereby deformed. This may reduce the likelihood of the opening of the door 14 due to external forces upon receiving a side impact of sufficient force.

Figure 3C:
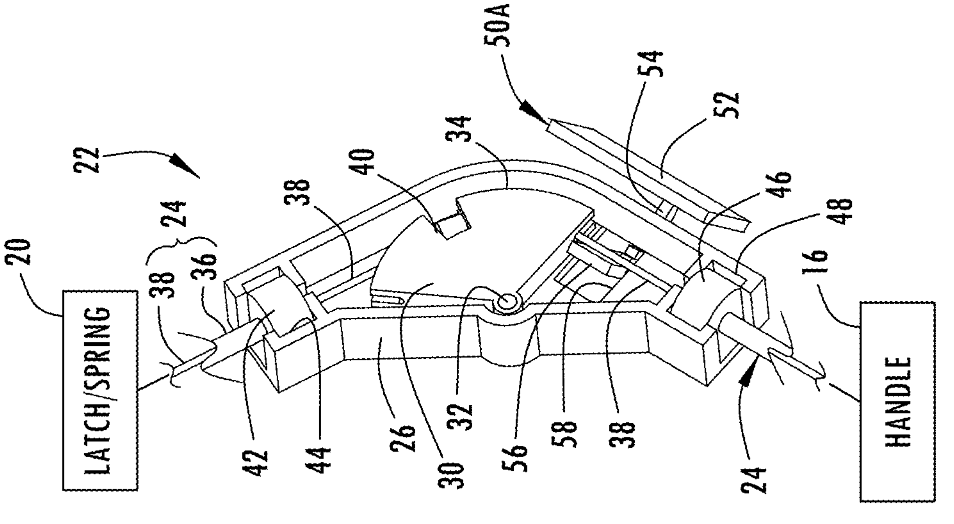
FIG. 3C is a side perspective view of the vehicle door latch assembly shown in FIG. 3A with the blocker mechanism blocking movement of the pivot arm in a latched position to reduce the likelihood of a door unlatching of the door latch.
Figure 3B:
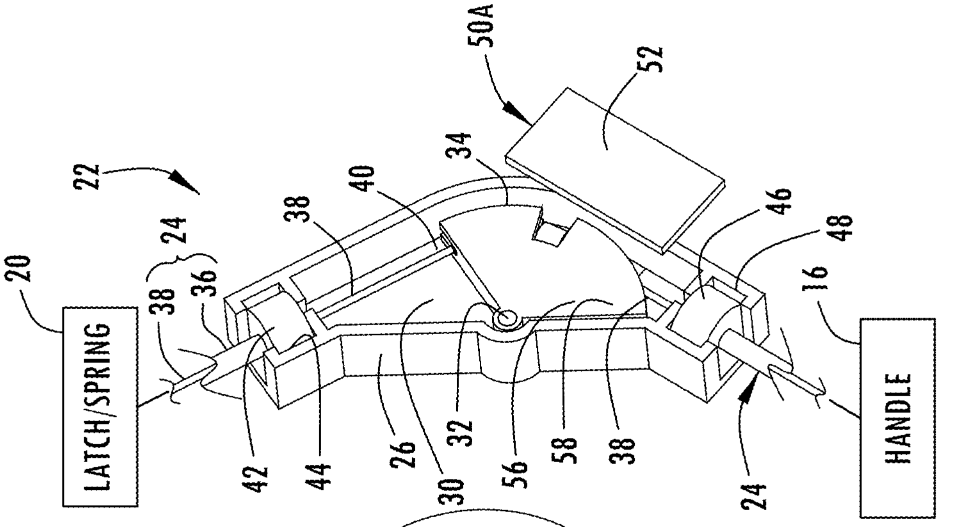
FIG. 3B is a side perspective view of the vehicle door latch assembly shown in FIG. 3A with the pivot arm in a door unlatched position.
Figure 3A:
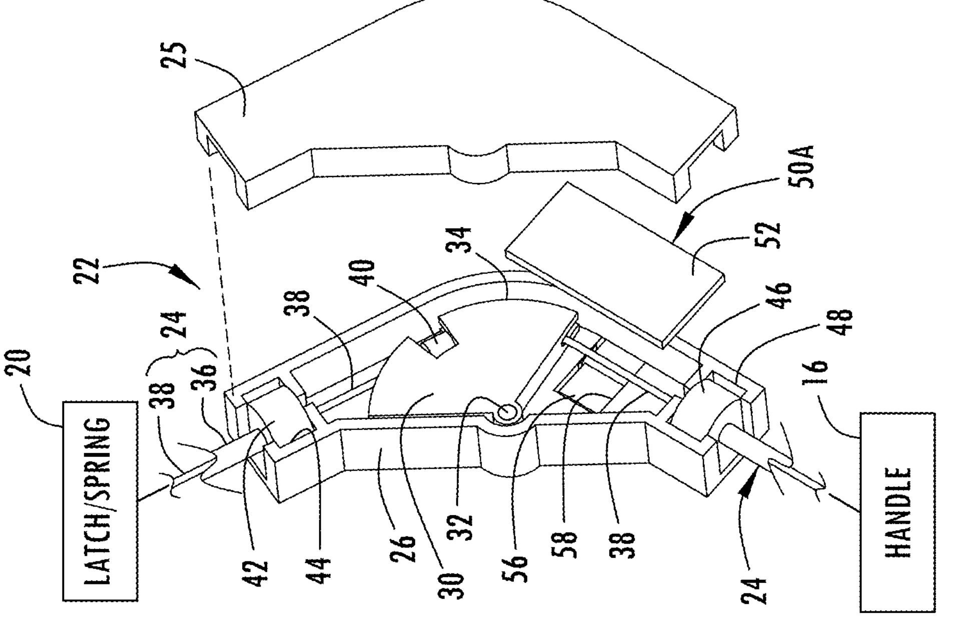
FIG. 3A is a side perspective view of a vehicle door latch assembly having a blocker according to a second embodiment with the pivot arm in the latched position.

Referring to FIGS. 3A-3C, the door latch assembly 20 with the cable assembly 22 is shown having a blocking mechanism 50A, according to a second embodiment. In this embodiment, the blocking mechanism 50A includes a force receiving pad 52 on the vehicle exterior side of the housing 26 and a foot 56 on the opposite side that is interconnected by a leg 54. The force receiving pad 52 is shown having a larger foot print or size than the foot 56. The blocking mechanism 50A is pivotably connected to a structure along a pivot axis that runs substantially parallel to the wire rope 38. The pivot arm 30 may rotate clockwise from the latched position shown in FIG. 3A to the unlatched position within the unblocked travel space 28 as shown in FIG. 3B prior to when there is no sufficient side impact force applied to the door 14, and more particularly the door latch assembly 20. The blocking mechanism 50A may rotate about the pivot axis upon receiving a force, such as a side impact force from an object, which in turn causes the foot 56 to rotate about the first axis towards the exterior through an opening 58 in the housing 26 as seen in FIG. 3C. In this position, the foot 56 extends into the travel space 28 to thereby block clockwise rotation of the pivot arm 30 to the unlatched position. As such, a side impact from an object with sufficient force applied to the door 14 and door latch assembly 20 applies a force to the force receiving pad 52 which rotates the blocking mechanism 50A to cause the foot 56 to block the travel space 28 and thereby reduce the likelihood of the door from being unlatched.

Accordingly, a vehicle door latch assembly 20 is provided with a cable assembly 22 that blocks movement of the pivot arm 30 to a door unlatched position upon receiving a sufficient side impact force to thereby reduce the likelihood of unexpected unlatching and opening of the door 14. It should be appreciated that the vehicle door latch assembly 20 may include other types and sizes of blocking mechanisms for blocking the movement of the pivot arm 30 during a vehicle side impact event.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle door latch assembly comprising:

a handle assembly configured to be assembled onto a door of a vehicle;

a latch assembly configured to move between a latched position latching the door in a closed position and an unlatched position; and a cable assembly operatively coupled between the handle assembly and the latch assembly, the cable assembly comprising:

a housing defining a travel space;

a cable operatively coupled between the handle assembly and the latch assembly and extending into the housing;

a pivot arm coupled to the cable and configured to rotate within the travel space when the handle assembly is actuated by a pull force; and a blocker mechanism located proximate to the travel space and configured to block movement of the pivot arm within the travel space when forcibly contacted with an object, wherein the blocker mechanism comprises a deformable material that compresses under force to extend within the travel space to block movement of the pivot arm.

2. The vehicle door latch assembly of claim 1, wherein the pivot arm rotates about a pivot axis and is connected to the cable.

3. The vehicle door latch assembly of claim 2, wherein the cable comprises a wire rope extending through a sheath.

4. The vehicle door latch assembly of claim 3, wherein the wire rope is connected to the pivot arm.

5. The vehicle door latch assembly of claim 4, wherein the cable comprises a Bowden cable.

6. The vehicle door latch assembly of claim 4, wherein the pivot arm has a cam surface that engages the wire rope.

7. The vehicle door latch assembly of claim 1, wherein the deformable material comprises metal.

8. The vehicle door latch assembly of claim 7, wherein the metal comprises a steel staple.

9. The vehicle door latch assembly of claim 1, wherein the blocker mechanism has a U-shape with sidewalls that allow the pivot arm to extend between the sidewalls to limit movement and extend into the travel space to reduce the likelihood of movement of the pivot arm between the sidewalls during an impact.

10. A vehicle door latch assembly comprising:

a handle assembly configured to be assembled onto a door of a vehicle;

a latch assembly configured to move between a latched position latching the door in a closed position and an unlatched position; and a cable assembly operatively coupled between the handle and the latch, the cable assembly comprising:

a housing defining a travel space;

a wire rope operatively coupled to the handle assembly and the latch assembly and extending into the housing;

a pivot arm coupled to the wire rope and configured to rotate within the travel space when the handle assembly is actuated by a pull force, wherein the pivot arm has a cam surface that engages the wire rope; and a blocker mechanism located proximate to the travel space and configured to block movement of the pivot arm within the travel space when forcibly contacted with an object, wherein the blocker mechanism comprises a deformable material that compresses under force to extend within the space to block movement of the pivot arm.

11. The vehicle door latch assembly of claim 10, wherein the pivot arm rotates about a pivot axis and is connected to the wire rope.

12. The vehicle door latch assembly of claim 11, further comprising a sheath surrounding a rotation of the wire rope.

13. The vehicle door latch assembly of claim 12, wherein the wire rope and sheath is a Bowden cable.

14. The vehicle door latch assembly of claim 10, wherein the deformable material comprises metal.

15. The vehicle door latch assembly of claim 14, wherein the metal comprises a steel staple.

16. The vehicle door latch assembly of claim 10, wherein the blocker mechanism has a U-shape with sidewalls that allow the pivot arm to extend between the sidewalls to limit movement and extend into the travel space to reduce the likelihood of movement of the pivot arm between the sidewalls during an impact.

* * * * *